United States Patent
Romer et al.

(10) Patent No.: US 7,137,277 B1
(45) Date of Patent: *Nov. 21, 2006

(54) METHOD AND DEVICE FOR PRODUCING COLORED GLASSES

(75) Inventors: Hildegard Romer, Karben (DE); Werner Kiefer, Mainz (DE); Wolfgang Schmidbauer, Mainz (DE)

(73) Assignee: Schott AG, Mainz (DE)

( * ) Notice: Subject to any disclaimer, the term of this patent is extended or adjusted under 35 U.S.C. 154(b) by 555 days.

This patent is subject to a terminal disclaimer.

(21) Appl. No.: 10/049,949

(22) PCT Filed: Aug. 16, 2000

(86) PCT No.: PCT/EP00/07989

§ 371 (c)(1),
(2), (4) Date: Apr. 22, 2002

(87) PCT Pub. No.: WO01/14266

PCT Pub. Date: Mar. 1, 2001

(30) Foreign Application Priority Data

Aug. 21, 1999 (DE) ................................. 199 39 785

(51) Int. Cl.
*C03B 5/185* (2006.01)
(52) U.S. Cl. ........................ 65/134.3; 65/135.6; 65/335; 65/347; 65/355; 373/27; 373/156
(58) Field of Classification Search .............. 65/134.3, 65/135.6, 326, 335, 346, 347, 355, 356, 121; 65/29.18, 33.2, 134.1, 134.7, DIG. 4; 373/146, 373/156, 163, 138, 27–35; 219/600, 672; 501/17

See application file for complete search history.

(56) References Cited

U.S. PATENT DOCUMENTS

| 3,244,495 A | | 4/1966 | Apple et al. .................... 65/161 |
| 3,942,968 A | | 3/1976 | Pieper ........................... 65/134 |
| 4,004,902 A | * | 1/1977 | Pieper ......................... 65/134.2 |
| 4,427,429 A | * | 1/1984 | Tiilikka ........................ 65/33.3 |
| 4,687,646 A | | 8/1987 | Mateika et al. .............. 422/248 |
| 4,780,121 A | * | 10/1988 | Matesa .......................... 62/134 |
| 5,268,925 A | * | 12/1993 | Binder et al. ................ 373/142 |
| 5,588,978 A | * | 12/1996 | Argent et al. ................ 65/29.1 |

FOREIGN PATENT DOCUMENTS

| DE | 33 16 546 | 4/1984 |
| DE | 234 853 | 4/1986 |
| DE | 35 35 792 | 12/1989 |
| FR | 2 613 351 | 10/1988 |

* cited by examiner

OTHER PUBLICATIONS

J. Moulin, et al.: *Nouveaux developpements dans la fusion des verees refractaires*, Bd. 26, No. 4-5, Jul. 1972.

*Primary Examiner*—Eric Hug
(74) *Attorney, Agent, or Firm*—Baker & Daniels

(57) ABSTRACT

The invention relates to a method and a device for producing colored glasses. The aim of the invention is to obtain a paricularly intimate mixture and to enable a quick change of the melt at the same time. To this end, the following procedure steps are applied: a melt made of a compound or fragments of glass is produced, the glass melt is further processed in at least one additional vessel, the melt is supplied to a skull device (3) (skull pot or skull channel) during subsequent processing, a dye is supplied (6, 6.1) to the melt after the melt was in the melting station (1) but before the melt enters the skull device (3) or while said melt is in the skull device.

13 Claims, 2 Drawing Sheets

METHOD AND DEVICE FOR PRODUCING COLORED GLASSES

Figure 1:
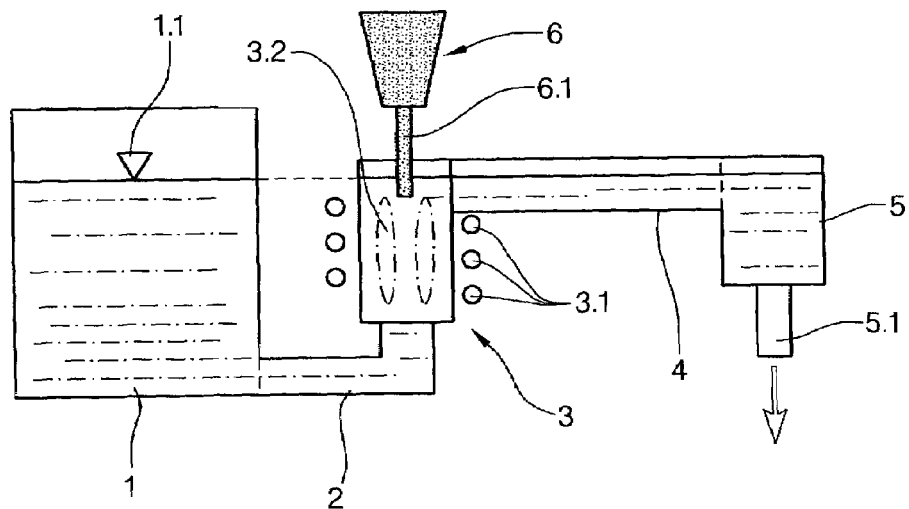

The glass production process starts with melting a so-called glass batch or refuse glass. The melting is usually performed in a melting end. It is walled of refractory material. Temperatures of up to 1650° C. are reached.

The melting process is followed by a refining process. It is used to expulse physically or chemically bound gases from the melt. Particularly high temperatures of up to 3000° C. are desirable in this process.

If one wishes to produce colored glass, the stain is added to the entire process already at an early stage, namely to the glass batch or the refuse glass during the melting process. This early addition of the stain is intended to ensure the most thorough mixing of the entire charge, i.e. of the stain on the one hand and the glass on the other hand, in order to avoid any waviness.

Melting ends usually have a relatively large volume. In the case of relatively small batches with differently colored glasses, it is necessary to perform a relatively frequent exchange of the content of the melting end. The exchange must be complete so as to avoid any undesirable deviations from the desired subsequent color. With respect to the aforementioned large volume of the melting end, the exchange will take a respectively long period of time. This means that the change from one color to another is linked to long interruption periods. A rapid response to customer wishes and new requirements concerning colorations is not possible.

Efforts have also been made to supply the stain only after the melting end. Homogenization is not always ensured in this case, however.

The invention is based on the object of providing a method and an apparatus with which frequent changes in color are possible without producing long interruption periods while maintaining a favorable thorough mixing of stain and glass.

The inventors have recognized that the addition of stain is possible after the melting end in order to fulfill the said object if the melting end is provided downstream with a skull crucible which is heated with high frequency. Such a skull crucible is known from DE 33 16 546 C1 for example. It is provided with a wall which is formed by a ring of vertical metal pipes which are water-cooled. A slot-like intermediate space remains between two mutually adjacent metal pipes. The electromagnetic high-frequency field as produced by an oscillating circuit of a coil penetrates the cooled wall without or with low losses and is thus available in the hot electric conductive melt for producing eddy currents and thus Joule heat.

Strong convection currents occur in the skull crucible. The melt is very cold in narrow zones due to the water cooling at the walls of the skull crucible, whereas only a few millimeters away it is extremely hot by the absorption of electromagnetic energy.

These large temperature gradients, which within a distance of a few millimeters can reach up to 1500° C. and more, lead to the occurrence of extremely fast convection rolls and thus to a very strong and effective thorough mixture of the melt zones. The thorough mixture not only causes a temperature and density offset, but especially also the desired offset of the chemical syntheses and thus a homogenization of the staining.

Moreover, the viscosity of the melt in such a skull unit, in which no temperature limits are predetermined by corrosion of the wall material, can be reduced nearly at will, which further increases the convection and facilitates the thorough mixing. Optimal viscosities for an effective thorough mixture are in the range of less than $10^2$ dPas, which requires temperatures over 1700° C. in many HMP (high melting point) glass systems such as the alumosilicate glasses and glass ceramics for example. Such temperatures are not accessible with classical units due to the corrosion of the refractory materials. Such melting temperatures can be reached without any problems whatsoever in HF-heated skull crucibles.

In accordance with the invention, the stain is thus supplied to the melt after the melting end and before a high-frequency heated skull crucible. The stain can also be added in the skull crucible per se. The relevant aspect is that the stain is added at such a place in the process so that it is still grasped by the aforementioned convection roll and can thus be thoroughly mixed with the melt.

The skull crucible will generally be a refining crucible. The skull crucible has a vertical axis. It is also possible to add the stain before or in a skull groove, which means a groove which is designed according to the skull principle and accordingly comprises water-cooled pipes which form the wall of the groove and a high-frequency coil through which energy is coupled into the content of the groove.

EMBODIMENTS

In discontinuous crucible trials with melt volumes of 4 L to 8 L, the thorough mixture in a skull crucible was examined based on the example of alumosilicate glass-ceramics. A few grams of an oxidic stain such as cobalt oxide or vanadium oxide were added to the melts directly above the melt surface at melt temperatures of 1800° C. to 2000° C. The energy supply was switched off after a maximum period of 5 minutes after the addition of the stain and the melt in the crucible was cooled. The crucible content was nearly completely homogeneously stained already after this short dwell period. Inhomogeneities were still observed merely in the zone of the crucible floor which does not take part in the convection in these discontinuous trials, which inhomogeneities could be eliminated in a continuous process or by higher melt temperatures (T>2000° C.).

In continuous processes it is possible to either add the stain in pure form to the melt or also a as glass which is highly doped with the stain. Especially in the case of a supply by way of a melting crucible which is disposed between the melting-in zone and the HF crucible, a glass is preferable to pure stain due to its meltability. Dosing is also usually less complicated in this case. In the case of supply via a rod, the stain can either also be introduced as a glass component of the rod or the stain can be compressed with a basic material.

The invention is now explained in closer detail by reference to the enclosed drawings, wherein the following is shown schematically:

FIGS. 1 to 4 each show an installation for producing colored glasses.

The supply of the stain is made at different places.

FIG. 1 shows a melting end 1. It contains a glass melt with a melt level 1.1.

A groove 2 is adjacent to the floor zone of the melting end 1. It opens into the floor zone of a skull crucible 3. The skull crucible 3 is enclosed by the windings 3.1 of a high-frequency coil. One recognizes the schematically shown convection roll 3.2. Skull crucible 3 is used for refining the melt as produced in melting end 1.

A further groove 4 is provided further downstream. It conducts refined melt from the upper zone of the skull crucible 3 to a conditioning vessel 5. It comprises an outlet 5.1.

The relevant aspect is that the stain is added to the skull crucible, namely from a stain reservoir 6 whose outlet 6.1 opens into the skull crucible 3.

This arrangement is relatively simple. It has the disadvantage, however, that the convection in the skull crucible 3 can be used only within limits.

Figure 2:
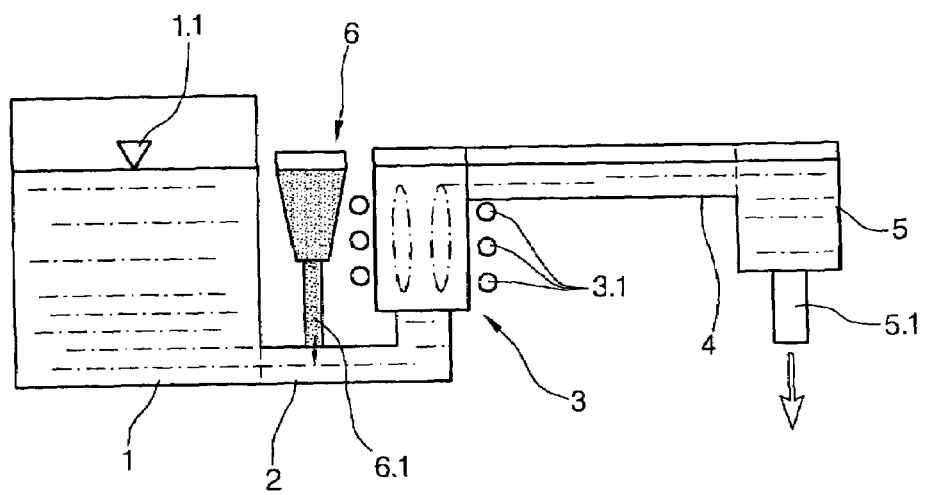

The embodiment according to FIG. 2 is essentially the same as the one according to FIG. 1. It differs however in the following: Stain reservoir 6 with outlet 6.1 is arranged in such a way that the stain 6.1 is injected into the connecting line 2. this is achieved in such a way that one sets the pressure in the stain reservoir 6 ("stain feeder") at a slightly higher level than the pressure in the connecting line 2. Depending on the density of the added stain concentrate it is necessary to vary the melt level in the stain feeder 6 with respect to the melt level 1.1 in the other system. If the density of the stain concentrate is higher than the density of the glass melt, the melt level in the stain feeder 6 must be chosen equal to or lower than that in the melting-in zone. If the density of the stain concentrate is lower than the density of the glass melt, the melt level of the concentrate in the stain feeder 6 must be chosen at a higher level than the melt level 1.1 in the melting end 1. The supply of the stain concentrate can be regulated either alone or by the hydrostatic pressure and the viscosity of the concentrate. It is also possible to provide the concentrate supply chamber in addition with an overpressure or underpressure control in order to enable the regulation of the stain quantity independent of melt level difference and viscosity.

The crucible may be made of platinum for example.

Figure 3:
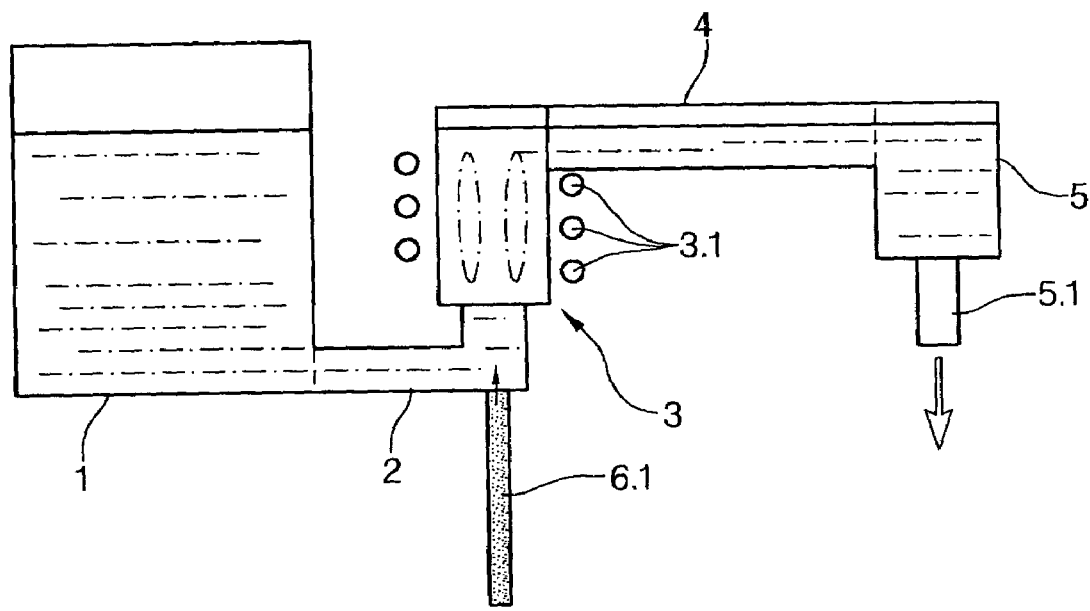

The principal arrangement of the unit according to FIG. 3 is the same as that of FIGS. 1 and 2. The difference is, however, that the stain concentrate is supplied by means of a duct 6.1 which, in the manner of an electrode, immerses into the melt. The pass-through is thus air- or water-cooled in order to ensure leak-proofness. The cooling is reduced when required during the re-supply of stain concentrate.

Figure 4:
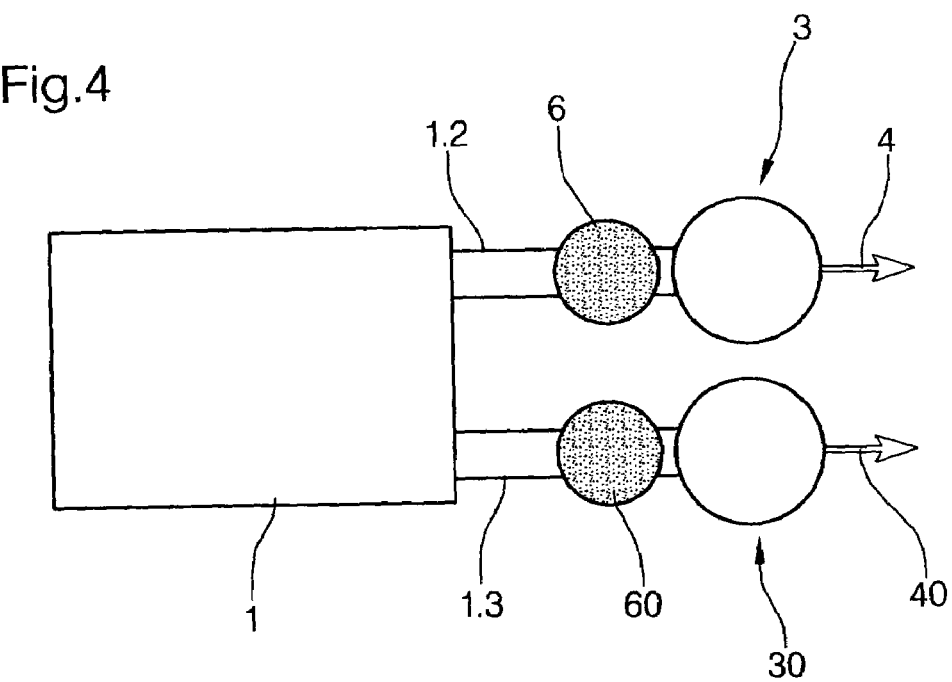

FIG. 4 shows a further option of the stain feeder 6 as described herein. The melting end 1 is provided in this case with two outlets 1.2, 1.3. Two skull crucibles 3, 30 are provided schematically. Each skull crucible 3 or 30 is assigned a stain feeder 6 or 60, respectively. This option allows producing two different colored glasses simultaneously with one melting end. Instead of two outlets 1.2 and 1.3, it is possible to also use three or more outlets with assigned stain feeders and associated skull crucibles.

The arrows 4 and 40 indicate that the respective colored glasses are supplied to further processing.

The invention claimed is:

1. A method for producing colored glasses, comprising: first producing in a melting-in station a melt of a glass batch or refuse glass;
   processing the glass melt in at least one further vessel;
   supplying the melt to a skull device in the course of further processing; and
   supplying the melt with a stain after the melting-in station and before or in the skull device.

2. A method as claimed in claim 1, including:
   causing two or more glass melt strands to branch off from the melting-in station;
   at least one of the glass melt strands being provided to the skull device; and
   supplying a stain melt to said at least one of the melt strands after the melting-in station, but before or in the respective skull device.

3. A method as claimed in claim 1, wherein the skull device is a skull crucible.

4. A method as claimed in claim 1, wherein the skull device is a skull groove.

5. A method as claimed in claim 1, wherein the melt is supplied with a stain before the skull device.

6. A method as claimed in claim 1, wherein the melt is supplied with a stain in the skull device.

7. An apparatus for producing colored glasses, comprising:
   a melting vessel for producing a melt from refuse glass or a glass batch;
   skull device positioned downstream of the melt vessel; and
   stain supply device;
   the stain supply device connected in downstream of the melt vessel and upstream of the skull device.

8. An apparatus as claimed in claim 7, characterized in that from the melt vessel there are at least two downstream strands each connected with a respective skull device and a respective stain supply device.

9. An apparatus as claimed in claim 7 wherein the skull device is a skull crucible.

10. An apparatus as claimed in claim 7, wherein the skull device is a skull groove.

11. An apparatus for producing colored glasses, comprising:
    a melt vessel for producing a melt from refuse glass or a glass batch;
    a skull device positioned downstream of the melt vessel;
    a stain supply device;
    the stain supply device being assigned to the skull device in such a way that the stain is supplied directly to the melt contained in the skull device.

12. An apparatus as claimed in claim 11, characterized in that from the melt vessel there are at least two downstream strands each connected with a skull device and a stain supply device.

13. A method for producing colored glasses, comprising: first producing in a melting-in station a melt of a glass batch or refuse glass;
    processing the glass melt in at least one further vessel;
    supplying the melt to a skull device in the course of further processing; and
    supplying the melt with a stain after the melting-in station and before or in the skull device;
    the melt and stain being subjected to convection currents in the skull device to cause mixing and homogenization of the melt and stain.

* * * * *